Oct. 1, 1963   J. W. FORREST   3,105,371
ADJUSTABLE SLIP CLUTCH
Filed Feb. 28, 1961   2 Sheets-Sheet 1
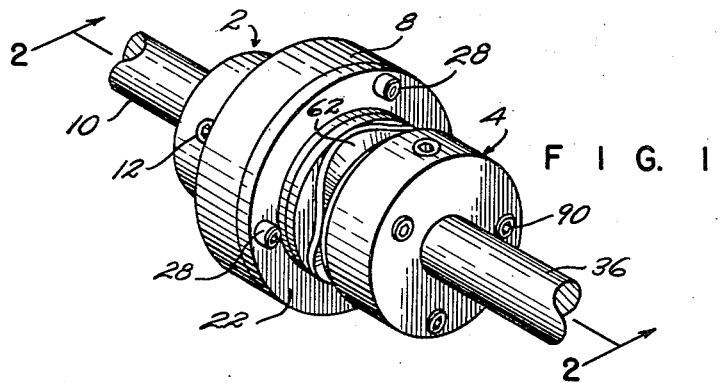
FIG. 1
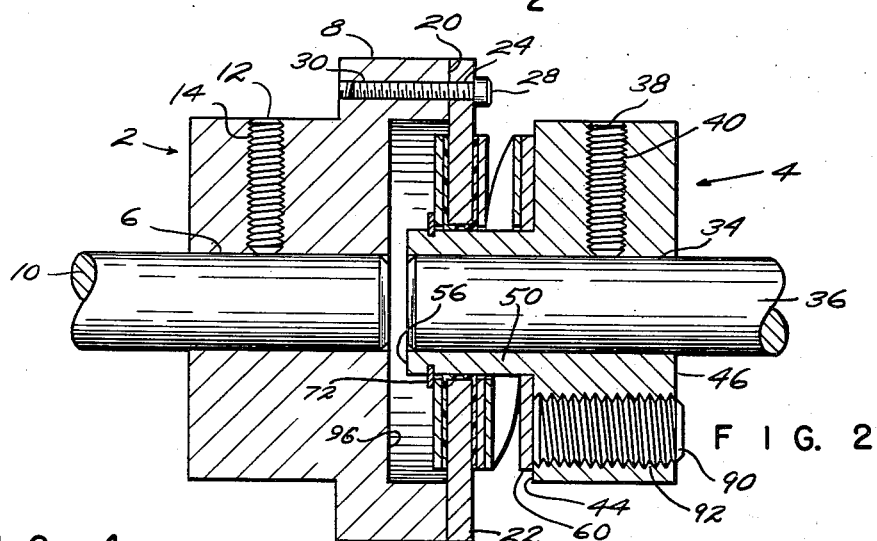
FIG. 2
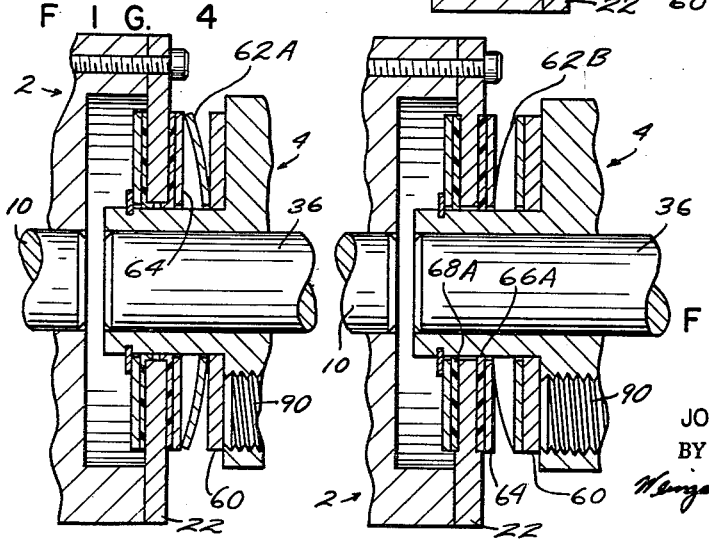
FIG. 4
FIG. 5
INVENTOR.
JOHN W. FORREST
BY
Weingarten, Ovenbuch & Poodecio
ATTORNEYS

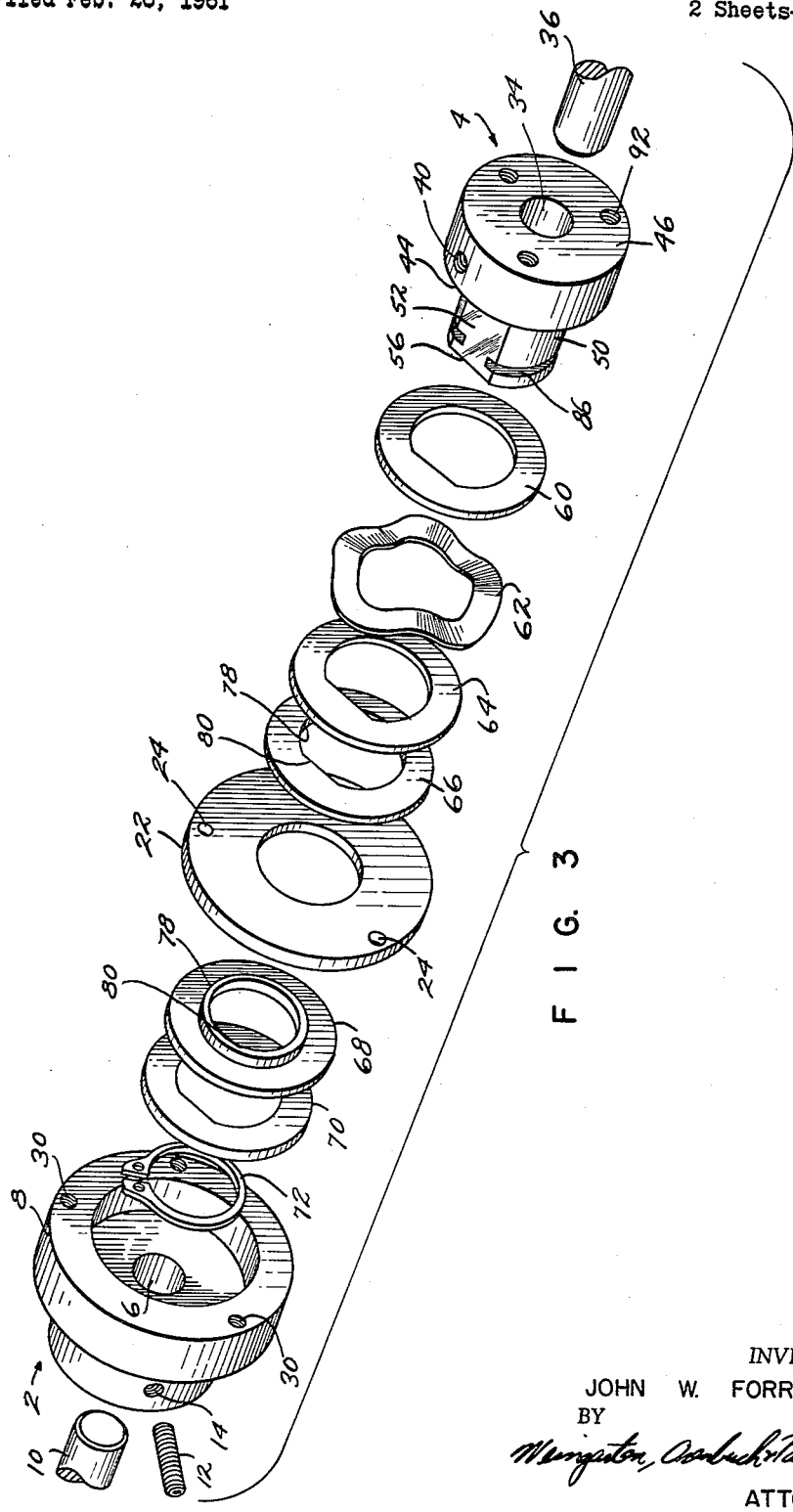

3,105,371
ADJUSTABLE SLIP CLUTCH
John W. Forrest, West Acton, Mass., assignor to Acton Laboratories, Inc., Acton, Mass., a corporation of Massachusetts
Filed Feb. 28, 1961, Ser. No. 92,218
3 Claims. (Cl. 64—30)

This invention relates to adjustable slip clutches and more particularly to miniature slip clutches which are adapted to provide against overloading of rotary components such as switches, potentiometers, etc., used in control systems.

The primary object of this invention is to provide a new miniature friction-face clutch which will couple two independent shafts together so as to transmit motion between these shafts.

Another object of the present invention is to provide a friction-face clutch capable of transmitting motion in either direction but so constructed that when a predetermined torque is exceeded, the coupled shafts will move independently of each other in a smooth manner.

A further object of the present invention is to provide an adjustable slip clutch wherein the slip torque may be easily adjusted over a relatively wide range without removing the clutch from the system in which it is incorporated.

Another object of the present invention is to provide a miniature adjustable slip clutch which is compact, easy to manufacture and assemble, and easy to mount in a control system.

In essence, the clutch comprises first and second hubs each adapted to be secured to a separate shaft, a friction disk removably secured to the face of one hub, an extension shaft on the other hub, and means frictionally coupling together said friction disk and said extension shaft whereby to provide a slip clutch connection between the two hubs.

Other objects and many of the attendant advantages of the present invention will become more readily apparent as reference is had to the following detailed specification when considered together with the accompanying drawings wherein:

FIG. 1 is a perspective view of a preferred embodiment of a slip clutch constructed according to the present invention;

FIG. 2 is a sectional view taken along line 2—2 of FIG. 1;

FIG. 3 is an exploded perspective view more fully illustrating the shape and disposition of the components of the clutch of FIG. 1;

FIG. 4 is a modification of the clutch of FIG. 1; and

FIG. 5 is a second modification of the same clutch.

Referring now to FIGS. 1, 2, and 3, the preferred embodiment of the present invention comprises a first hub identified generally at 2 and a second hub identified generally at 4. Hub 2 consists of a central bore 6 and an enlarged end collar 8. The central bore 6 is appropriately sized to receive a first input output shaft 10. Hub 2 is clamped to shaft 10 by means of set screws 12 which screw into tapped holes 14 formed in the hub. Preferably, at least two set screws 12 are used for clamping hub 2 to the shaft. The collar 8 has an end face 20 and secured to this end face 20 is an annular stainless steel friction disk 22. Disk 22 is provided with three equally spaced holes 24 which function to accommodate suitable fasteners which serve to secure the disk to the end face 20. The fasteners may be screws or rivets. In this case, the disk 22 is secured to the collar 8 by means of three socket-head screws 28 which are received in tapped holes 30 formed in collar 8.

The second hub 4 is also provided with a central bore 34 which is adapted to accommodate a second input-output shaft 36. Hub 4 is secured to shaft 36 by means of set screws 38 which are received in tapped holes 40 formed in hub 4. Preferably, at least two holes 40 are provided in the hub 4 in order to assure appropriate clamping of the hub to shaft 36.

Hub 4 has opposite end faces 44 and 46 respectively. On its end face 44 it is provided with a shaft extension 50 which is flatted as shown at 52 in FIG. 3. This shaft extension may be solid, in which case the central bore 34 of hub 4 would extend up to approximately the end face 44. Alternatively and preferably, as illustrated in FIG. 2, the shaft extension 50 is hollow, having a central bore which is an extension of the axial bore 34 of hub 4. This permits the shaft 36 to extend up to the end face 56 of shaft extension 50. The hub 4 is coupled to disk 22 on hub 2 by means hereinafter described which are mounted on the shaft extension 50.

The shaft extension 50 supports a plurality of elements 60, 62, 64, 66, 68, 70, and 72. The elements 60, 64, and 70 are identical metallic thrust washers having a circular outer configuration and a generally D-shaped inner configuration adapted to mate with the flatted shaft extension 50. The element 62 is a spring metal washer of corrugated, i.e., wavelike, configuration. The elements 66 and 68 are identical annular friction rings and are made of plastic. These friction rings have bosses or axial flanges 78 which are flatted as shown at 80 in FIG. 3 so as to mate with the flatted shaft extension 50.

The outer diameter of the circular portions of bosses 78 is slightly less than the inner diameter of disk 22, thereby permitting the bosses 78 to be inserted in disk 22. The axial dimension of the bosses 78 is less than one-half the thickness of the friction disk 22. Accordingly, when disk 22 is sandwiched tight between friction rings 66 and 68 with the bosses 78 disposed in the central opening of the disk, the bosses will be spaced from and will not engage each other. This spacing is illustrated in FIG. 2. The element 72 is a conventional metal snap-action retaining ring.

The foregoing elements are mounted on shaft extension 50 in the order named. The thrust washer 60 engages the end face 44 of hub 4. The washers 64 and 70 frictionally engage the plastic friction rings 66 and 68. The friction disk 22 is sandwiched tight between the two friction rings 66 and 68. The retaining ring 74 snaps into an appropriate groove 86 in shaft extension 50 adjacent to its end face 56.

The manner in which the above-described components are assembled is simple and straight forward. First of all, thrust washer 60, compression spring washer 62, thrust washer 64, and plastic friction ring 66 are assembled on shaft extension 50 of hub 4 in the order named. Thereafter the friction disk 22 is slipped onto shaft extension 50. Friction disk 22 is followed by the friction ring 68 and thrust washer 70. Thereafter the retaining ring 72 is snapped into groove 86, trapping the foregoing elements between the ring 72 and end face 44. It is to be observed that the thicknesses of the various elements 22 and 60 to 72 is such that in order to mount them on shaft extension 50 as above described, the spring 62 must be compressed slightly and when so assembled, the amount of torque required to rotate disk 22 relative to hub 4 is relatively small. However, the torque required to overcome the friction between disk 22 and rings 66, 68 can be increased by forcing the thrust washer 60 toward retaining ring 72. This is accomplished by means of three adjusting socket screws 90 which screw into three equally spaced holes 92 provided in hub 4. These holes 92 extend from end face 44 to the end face 46, whereby the lead ends of screws 90 can engage thrust washer 60 while their outer ends are accessible to a socket wrench at face 46. The "give" of spring 62 is substantial, thereby allowing the torque limit to be varied through a relatively wide range by adjustment of screws 90. The torque can be set a predetermined limit at the time the clutch is assembled or later when it has been installed between a pair of shafts so as to couple them together.

Assuming that the foregoing clutch assembly has been mounted on a pair of shafts such as the shafts 10 and 36, rotation of one shaft, e.g., shaft 10, will result in rotation of the other shaft so long as the torque resistance of shaft 36 does not exceed the torque limit of the clutch established by the setting of screws 90. When the torque resistance of shaft 36 reaches the torque limit of the clutch, the clutch will begin to slip, thereby permitting the shaft 10 to rotate freely. The slippage will occur between the plastic friction rings 66 and 68 which are keyed to shaft extension 50 and friction disk 22. In this connection, it is to be observed that disk 22 is engaged by plastic rings 66 and 68 not only on its opposite faces but also on its inner edge surface, the latter being engaged by the bosses 78 of the two rings. The bosses are not intended to serve and do not serve as friction or clutching elements. Their function is to serve as bushings for centering disk 22 relative to the aixs of shaft extension 50, whereby to promote smooth relative rotation between the two hubs when the preselected torque limit has been exceeded.

Referring now to FIGS. 4 and 5, it is to be observed that a slip clutch embodying the present invention need not be made in exactly the manner illustrated in FIGS. 1-3. Thus, for example, the compression spring washer 62 need not be of corrugated or wavelike configuration but may take another alternative form, such as the washer 62A of FIG. 4 or the washer 62B of FIG. 5. Spring washer 62A is an annular ring of concave-convex construction, its concave side engaging thrust washer 64 and its convex side engaging thrust washer 60. Washer 62B is an annular washer which is bent at two diametrically opposed points, sometimes called a "bow ring" spring washer.

FIG. 5 illustrates still another modification. In this case, the two plastic friction rings 66A and 68A are not formed with bosses. Instead, they are flat annular members having D-shaped central openings sized to mate with flatted shaft extension 50 whereby to prevent them from rotating relative to hub 4.

Slip clutches constructed according to the foregoing teachings have many advantages. For one thing, they can be made relatively small yet be relatively strong. Another advantage is that they are easily manufactured and easly assembled. In this connection it is to be noted that the outside diameter of hub 4 is less than the diameter of the circle which forms the locus of holes 30. Thus, removal of screws 28 is an easy matter, thereby facilitating detachment of hub 2 from hub 4. Also notable is the fact that either hub may serve as the input or output hub, although one hub may be designated as the input hub and the other as the output hub for convenience of reference and description. Thus, in practice hub 2 is generally called the input hub while hub 4 is called the output hub.

A further advantage is that the slip torque can be easily adjusted over a wide range. The range of slip torque is relatively wide. In a typical construction wherein the outside diameter of the collar 8 measured 11/16 inch and the overall axial dimension of the whole clutch assembly measured 11/16 inch, the torque range was adjustable from 2 to 32 ounce inches. Perhaps the most advantageous feature of the foregoing clutch construction is that the slip torque can be adjusted without removing the clutch from the control system in which it is mounted. This is due to the accessability of adjusting screws 90.

It is to be noted also that the two plastic friction ring washers 66 and 68 may be omitted entirely and that thrust washers 64 and 70 may be made to engage the friction disk 22 directly. In this connection, it is to be understood that the washers 64 and 70 may be provided with suitable friction coatings on the faces thereof which engage friction disk 22. It is to be noted also that the materials of which the friction disk 22 and the cooperating friction rings are made is subject to variation. Thus, for example, it is contemplated that disk 22 may be made of a material other than stainless steel and further that it may be provided on its opposite faces with a suitable friction coating, whereby to increase the torque required to cause clutch slippage. It is preferred that friction rings 66 and 68 be made of an acetal resin such as Delrin. However, they may also be made of a tetrafluoroethylene resin such as Teflon.

It is to be observed also that the end face 56 of the shaft extension 50 does not engage or rub against the adjacent end face 96 of input hub 2. However, it is contemplated that the shaft extension 50 may be lengthened so as to make flip-friction engagement wtih the adjacent end face of hub 2. It is further contemplated that end face 96 of hub 2 may be provided with a counterbore for the central bore 6, the counterbore being sized to provide a bearing surface for the end of the shaft extension 50 of the output hub 4. Of course, shaft 10 would have to be shortened somewhat while shaft extension 50 would have to be lengthened enough to seat in the counterbore. Journaling shaft extension 50 in hub 2 in this manner would serve to provide further assurance of concentricity between the two hub sections. However, extensive uses of clutches of the type shown in FIGS. 1-3 have not indicated that this added assurance of concentricity is necessary.

While the invention as illustrated and described embodies two unitary hubs, each of which is adapted to be secured to a shaft, it is to be understood that either of them may be formed integral with a shaft. Moreover, the term "shaft" is employed herein in a broad sense to cover any rotatable element to which one of the hubs may be coupled or which may be formed with a hub as an integral part thereof. Similarly, the term "hub" is used herein in a broad sense, and, for example, it need not have a central bore adapted to receive a shaft, but may be formed integral with a shaft or connected thereto by a separate coupling member. Alternatively, the shaft could be provided with an axial bore into which the hub could be inserted and clamped.

Obviously, many other modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

What is claimed is:

1. An adjustable slip clutch capable of maintaining precise alignment between two shafts connected thereby, comprising a first hub having a shaft extension on an end face thereof, said first hub having a first outside diameter and said shaft extension having a second outside diameter smaller than said first diameter, said first hub also having a first axial bore for accommodating a first shaft, means for securing said first hub to a first shaft disposed in said first axial bore, an annular friction disc rotatably disposed on said shaft extension, said disc having a third outside diameter larger than said first diameter, a first ring on said shaft extension between said end face and said disc, said first ring engaging one side of said disc, a second ring on said shaft extension engaging the opposite side of said friction disc, said first and second rings locked against rotation relative to said shaft extension, means on said shaft extension preventing said second ring from moving away from said friction disc, a spring washer on said shaft extension between said end face and said first ring, a third ring on said shaft extension between said spring washer and said end face, a plurality of first screws disposed in tapped holes in said first hub eccentric and parallel to said shaft extension, said first screws engaging and acting through said third ring to compress said spring washer against said first ring, whereby to force said first ring toward said second ring to grip said friction disc therebetween and thereby establish a torque resistance between said first hub and said friction disc, a second hub having a second end face and also a second axial bore for accommodating a second shaft, means for securing said second hub to a second shaft disposed in said second axial bore, and a plurality of second screws securing said friction disc to said second end face, said second screws disposed in tapped holes in said second end face located a further radial distance from the longitudinal axis of said shaft extension than the outside surface of said first hub, whereby (1) the torque resistance between said first hub and said friction disc can be varied by adjustment of said first screws and (2) said clutch may be disconnected without removal of said hubs from said shafts by removal of said second screws.

2. An adjustable slip clutch comprising a first hub having a face disposed in a plane extending at right angles to the longitudinal axis thereof, an annular friction disc, a plurality of screws securing said friction disc to said face, a second hub smaller in diameter than said face, said second hub having a shaft extension, said shaft extension disposed within said friction disc and rotatable relative thereto, first means on said shaft extension engaging one face of said friction disc, second means on said shaft extension engaging the opposite face of said friction disc, means on said shaft extension preventing removal thereof from within said friction disc, spring means on said shaft extension for forcing said first and second means toward each other whereby to grip said friction disc therebetween so as to establish a torque resistance between said second hub and said friction disc, and a plurality of additional screws carried by said second hub and operative through said spring means to vary the axial thrust between said first and second means, whereby to vary said torque resistance.

3. An adjustable slip clutch comprising a first hub having a face disposed in a plane extending at right angles to the longitudinal axis thereof, an annular friction disc, a plurality of screws securing said friction disc to said face, a second hub smaller in diameter than said face, said second hub having a shaft extension, said shaft extension disposed within said friction disc and rotatable relative thereto, first means on said shaft extension engaging one face of said friction disc, second means on said shaft extension engaging the opposite face of said friction disc, means on said shaft extension preventing removal thereof from within said friction disc, spring means on said shaft extension for forcing said first and second means toward each other whereby to grip said friction disc therebetween so as to establish a torque resistance between said second hub and said friction disc, and a plurality of additional screws carried by said second hub and operative through said spring means to vary the axial thrust between said first and second means, whereby to vary said torque resistance, said additional screws being disposed eccentric to the longitudinal axis of said second hub in radial spaced relation to said shaft extension.

References Cited in the file of this patent
UNITED STATES PATENTS

| | | |
|---|---|---|
| 1,002,310 | Procunier | Sept. 5, 1911 |
| 1,119,798 | Bowers | Dec. 8, 1914 |
| 1,373,810 | Hansen | Apr. 5, 1921 |
| 1,714,748 | Wright | May 28, 1929 |
| 1,807,210 | Hinnekens | May 26, 1931 |
| 1,887,355 | Kranick | Nov. 8, 1932 |
| 2,659,220 | Cherry | Nov. 17, 1953 |
| 2,708,836 | Stuart | May 24, 1955 |
| 2,782,813 | Dudek | Feb. 26, 1957 |
| 2,857,750 | Fox | Oct. 28, 1958 |
| 2,872,794 | Slome | Feb. 10, 1959 |